(12) United States Patent
Khoshnevisan et al.

(10) Patent No.: US 8,850,362 B1
(45) Date of Patent: Sep. 30, 2014

(54) MULTI-LAYERED HIERARCHICAL BROWSING

(75) Inventors: Cyrus Khoshnevisan, Mercer Island, WA (US); Minal Mehta, Kirkland, WA (US); Jason P. Patrikios, Seattle, WA (US); Scott Allen Mongrain, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 822 days.

(21) Appl. No.: 11/948,869

(22) Filed: Nov. 30, 2007

(51) Int. Cl.
*G06F 3/048* (2013.01)

(52) U.S. Cl.
USPC .......................................................... 715/853

(58) Field of Classification Search
CPC ................................................. G06F 17/30327
USPC ........................................................... 715/853
See application file for complete search history.

(56) References Cited

U.S. PATENT DOCUMENTS

| | | | | |
|---|---|---|---|---|
| 5,418,961 A * | 5/1995 | Segal et al. | ............................. | 1/1 |
| 6,055,515 A * | 4/2000 | Consentino et al. | ......... | 705/27.1 |
| 6,072,490 A * | 6/2000 | Bates et al. | .................... | 715/821 |
| 6,360,216 B1 * | 3/2002 | Hennessey et al. | .................... | 1/1 |
| 6,466,918 B1 * | 10/2002 | Spiegel et al. | ................... | 705/27 |
| 6,509,908 B1 * | 1/2003 | Croy et al. | ...................... | 715/716 |
| 7,603,367 B1 * | 10/2009 | Kanter et al. | .......................... | 1/1 |
| 7,698,261 B1 * | 4/2010 | Khoshnevisan | ....... | 707/999.003 |
| 8,560,398 B1 * | 10/2013 | Gregov et al. | ............... | 705/26.2 |
| 2001/0044758 A1 * | 11/2001 | Talib et al. | ........................ | 705/27 |
| 2003/0112467 A1 * | 6/2003 | McCollum et al. | ........... | 358/1.18 |
| 2005/0138022 A1 | 6/2005 | Bailey et al. | | |
| 2005/0222987 A1 * | 10/2005 | Vadon | ................................ | 707/3 |
| 2006/0070004 A1 * | 3/2006 | Miller et al. | ................... | 715/760 |
| 2008/0288538 A1 * | 11/2008 | Hunt et al. | .................. | 707/104.1 |
| 2008/0288889 A1 * | 11/2008 | Hunt et al. | ...................... | 715/810 |

* cited by examiner

*Primary Examiner* — William Bashore
*Assistant Examiner* — Henry Orr
(74) *Attorney, Agent, or Firm* — Knobbe, Martens, Olson & Bear, LLP

(57) ABSTRACT

A method and system are disclosed for browsing an electronic hierarchical product catalog. The catalog is organized as a tree data structure with each node corresponding to an item category, an item sub-category, or an attribute that describes characteristics of items in a category. Such attributes may be used as filters for searching for an item or item category. The catalog tree is a collection of linked independent sub-trees including category and attribute sub-trees. The sub-trees allow navigation of the catalog tree via links between various nodes. The sub-trees may be linked to multiple other sub-trees, providing easy navigation for users and simplifying the addition of new sub-categories and attributes to the catalog tree, for service providers. The use of linked sub-trees also allows attributes set by the user in a previous search to be used in a subsequent search for a similar item.

22 Claims, 13 Drawing Sheets

MULTI-LAYERED HIERARCHICAL BROWSING

TECHNICAL FIELD

The present disclosure is generally directed to systems and methods that display items organized in a hierarchical structure and efficient browsing of such hierarchical structure.

BACKGROUND

In a typical network-based merchandising environment, a user can search for items (i.e., goods and/or services) within a category or group of items in an electronic item catalog. A catalog of items (including each item's description) may be organized into a browse tree structure in order to facilitate searching. As the name suggests, a "browse" tree permits users to browse through various items, which are logically arranged in the form of a hierarchical tree. Each node of the tree (a browse node) may be associated with a category of items in a hierarchical manner. Moreover, the browse tree may be displayed via a user interface as a collection of hyperlinks, each hyperlink corresponding and providing further access to a browse node of the tree. For example, the "root" node of a tree representing all items has many browse nodes corresponding to categories such as "books," "electronics," "gourmet food," etc. Each such browse node may have different child browse nodes representing sub-categories.

For example, a parent browse node such as "gourmet food" may have a number of child browse nodes such as "Fruits & Vegetables," "seasonal," etc. Accordingly, to find an item within the gourmet food category, a user may select a hyperlink associated with the child browse node coded Fruits & Vegetables. Selecting Fruits & Vegetables will display a list of further child browse nodes or presenting sub-categories including "cheese baskets." In turn, selecting "cheese baskets" will display a list of available cheese baskets for purchase. In this manner, a user can search through a browse tree and locate the specific items of interest for purchase. However, if the user is interested in additional information and attributes regarding a specific item or category of items, such as "price," "origin," or "cuisine" the user must further refine his search by selecting specific values for such attributes. For example, the user may be interested in food from a particular region of origin or cuisine, such as Italy, in the price range of $50 to $100. Currently, if the user wants to browse additional items in the same price range and from the same region of origin, the user may have to navigate back up the browse tree toward the root (i.e., more general item categories) and go back down another branch of the browse tree toward another new sub-category of items of interest. When the user reaches the new sub-category, he would have to reenter the values for the attributes, such as the price range and the region of origin, to refine his search for the new item of interest. This process can be cumbersome and time consuming.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A catalog or database of items capable of being searched may be organized into a browse tree structure. In accordance with aspects of the present disclosure, attributes that describe and are common to the items in each category can be assigned or associated with the browse node for the category. Such attributes may be used to focus, browse, and search for an item or item category. In effect, such attributes may be used as filters to refine the search and browse for various items. When a user searches or browses for two different items which may share some attributes, such as price, material, origin, etc., the values previously assigned by the user to such attributes for refinement of his search and/or browse are maintained by the system and may be used in the subsequent search for the different item having the same attributes. This way, the user can utilize his previously entered values for refinement of his search and not have to reenter the same attributes values, such as price range, for subsequent browse or search for a different item. The item category information and attributes or search refinement parameters are organized into independent sub-trees which are reusable for multiple items associated with those categories and/or attributes and refinements. Such organization of data into multiple independent sub-trees reduces memory requirements of the system and simplifies user interface design. The multiple category and attributes sub-trees may be linked together to create different product trees including the category and attribute sub-trees.

Figure 1:
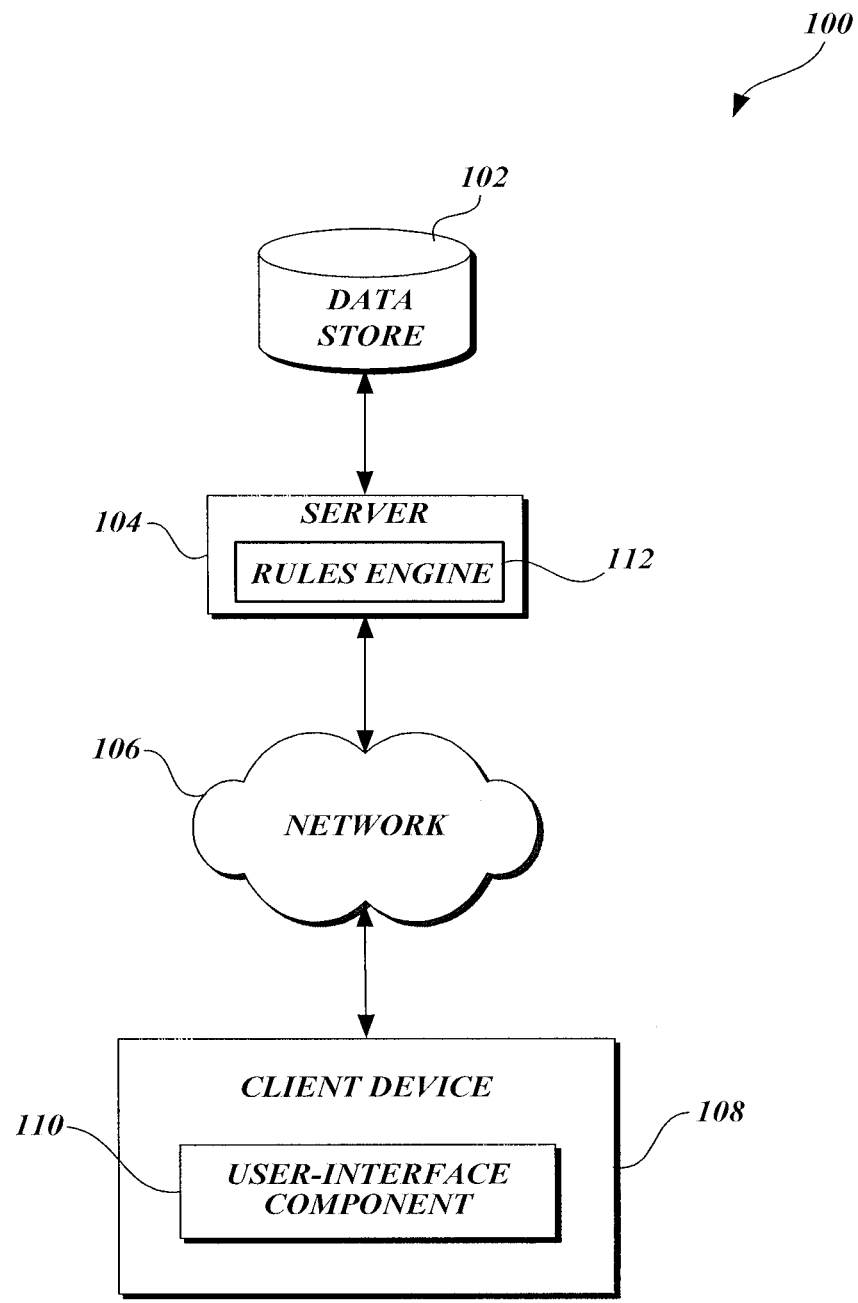
FIG. 1 is a block diagram of an illustrative operating environment including a data store, a server, and a client device.

With reference now to FIG. 1, an illustrative operating environment 100 is shown including a server 104 for retrieving browse node attributes from a data store 102 in response to a request received from at least one client device 108 via a network 106. Those skilled in the art will recognize that more than one client device 108 may communicate with the server 104 and that the client device 108 may be any of a number of computing devices that are capable of communicating over a network, including, but not limited to, set-top boxes, personal digital assistants, mobile phones, digital media players, Web pads, tablets, laptop computers, desktop computers, electronic book readers, etc. Protocols and components for providing communication between the client device 108 and the server 104 via the network 106 are well known to those skilled in the art of computer communications and thus, need not be described in more detail herein.

In one embodiment, a catalog of items organized as one or more browse trees is stored in the data store 102. Those skilled in the art will recognize that data store 102 may comprise one or more data stores located locally or remotely relative to the server 104. In addition, those skilled in the art will recognize that if more than one browse tree is stored, the browse trees may be interconnected and/or overlapping. Accordingly, a user browsing in one tree may browse to another without significant interruption. In addition to the browse tree, the data store 102 stores the browse node attribute data associated with each browse node of the browse tree. As noted above, the browse node attributes can be used to describe and/or identify a quality of items that fall into a certain category associated with the browse node. In addition, the attributes associated with a browse node may be common to all or a substantial portion of the items that fall within the browse node. In one embodiment, a subject-matter expert creates the browse node attribute data associated with each browse node. In yet other embodiments, attributes are automatically or algorithmically determined and associated with each browse node.

In the illustrated embodiment, a user may request data from the data store 102 via a user-interface component 110 implemented by the client device 108. In one embodiment, the user-interface component 110 represents the front-end of a stand-alone application, such as a Web browser. Alternatively, the user-interface component 110 can be integrated with one or more software applications. For example, the user-interface component 110 could be integrated into a customized purchasing service implemented by the server 104 such that potential purchasers are able to view item attributes before making a purchase of an item.

One skilled in the relevant art will appreciate that the data and/or components described above may be stored on a computer-readable medium and loaded into memory of the client device 108 or server 104 using a drive mechanism associated with the computer-readable medium, such as a floppy, CD-ROM, DVD-ROM drive, or network interface. Further, the components can be included on a single device or distributed in any manner. For example, all components could be located on the client device 108. Furthermore, the components shown in FIG. 1 represent an illustrative embodiment. In other embodiments, components can be removed or their functionality can be provided by another component. For example, the user-interface component 110 may be removed or its functionality could be provided by another component.

Figure 2A:
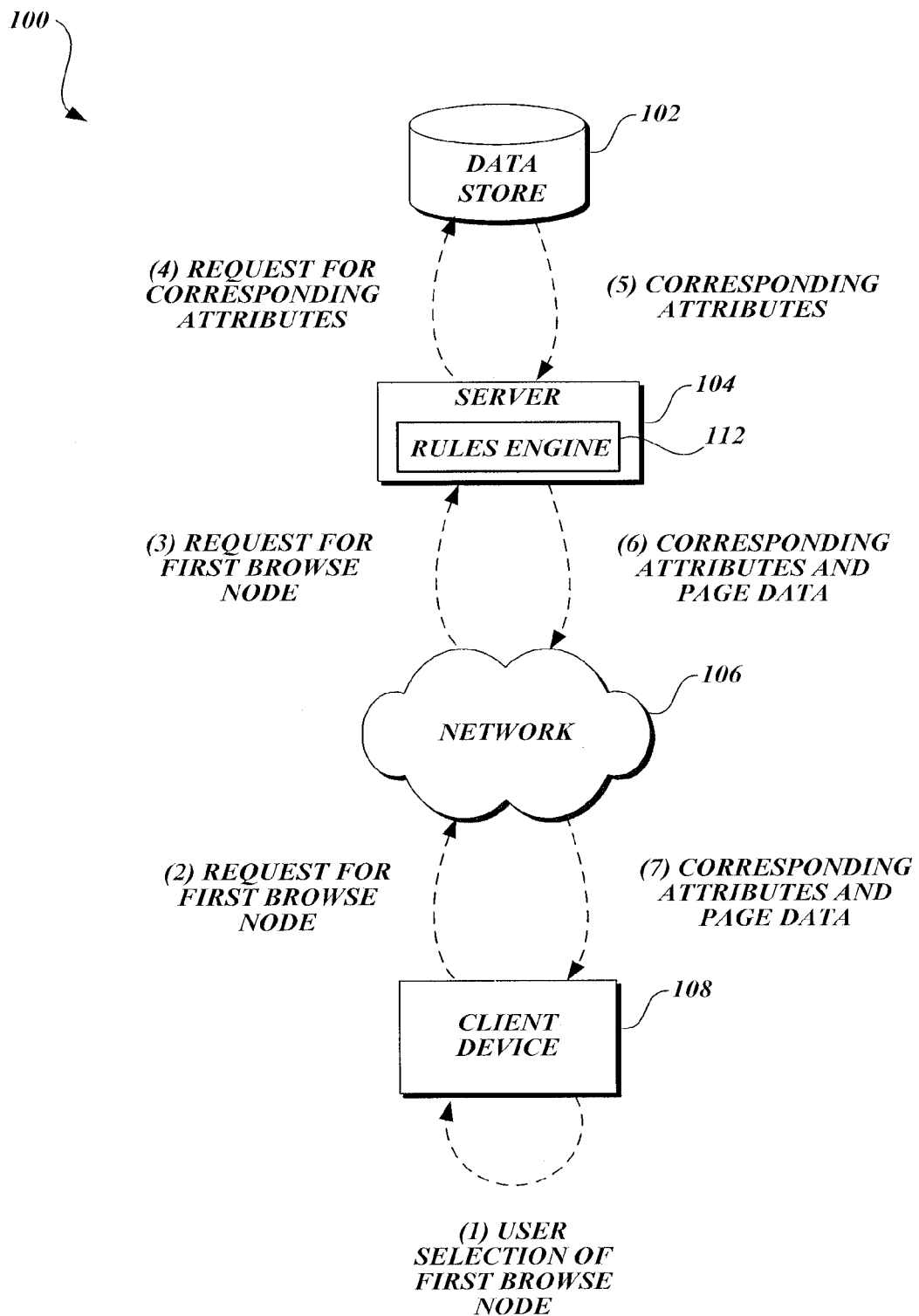
FIG. 2A is a block diagram of an illustrative client device request for a first browse node and corresponding attributes from the server and data store shown in FIG. 1.

With reference now to FIG. 2A, the interaction by various components of the operating environment 100 to display browse node attributes corresponding to a first browse node of a browse tree will be described. As illustrated in FIG. 2A, browse nodes of a browse tree may be made accessible to a user via a user interface, such as a Web page, retrieved from the server 104 and displayed by the user-interface component 110 of the client device 108. Accordingly, each browse node may be displayed and accessed as a hyperlink on a Web page. Therefore, a user in search of an item of a particular type or category may select a first browse node associated with the category within which the item falls by clicking a hyperlink within the Web page. In response, the client device 108 issues a request for the first browse node. The request for the first browse node can be transmitted to the server 104 via a communications network 106, such as the Internet. The server 104 receives the request and issues a query to the data store 102 for data regarding the items categorized in the first browse node including the attributes which correspond to the first browse node. It will be appreciated by those skilled in the art, that one or more attributes (which one or more attributes may be referred to as a "set" of attributes) may correspond to a browse node and that some browse nodes may not be associated with any attributes.

Figure 8:
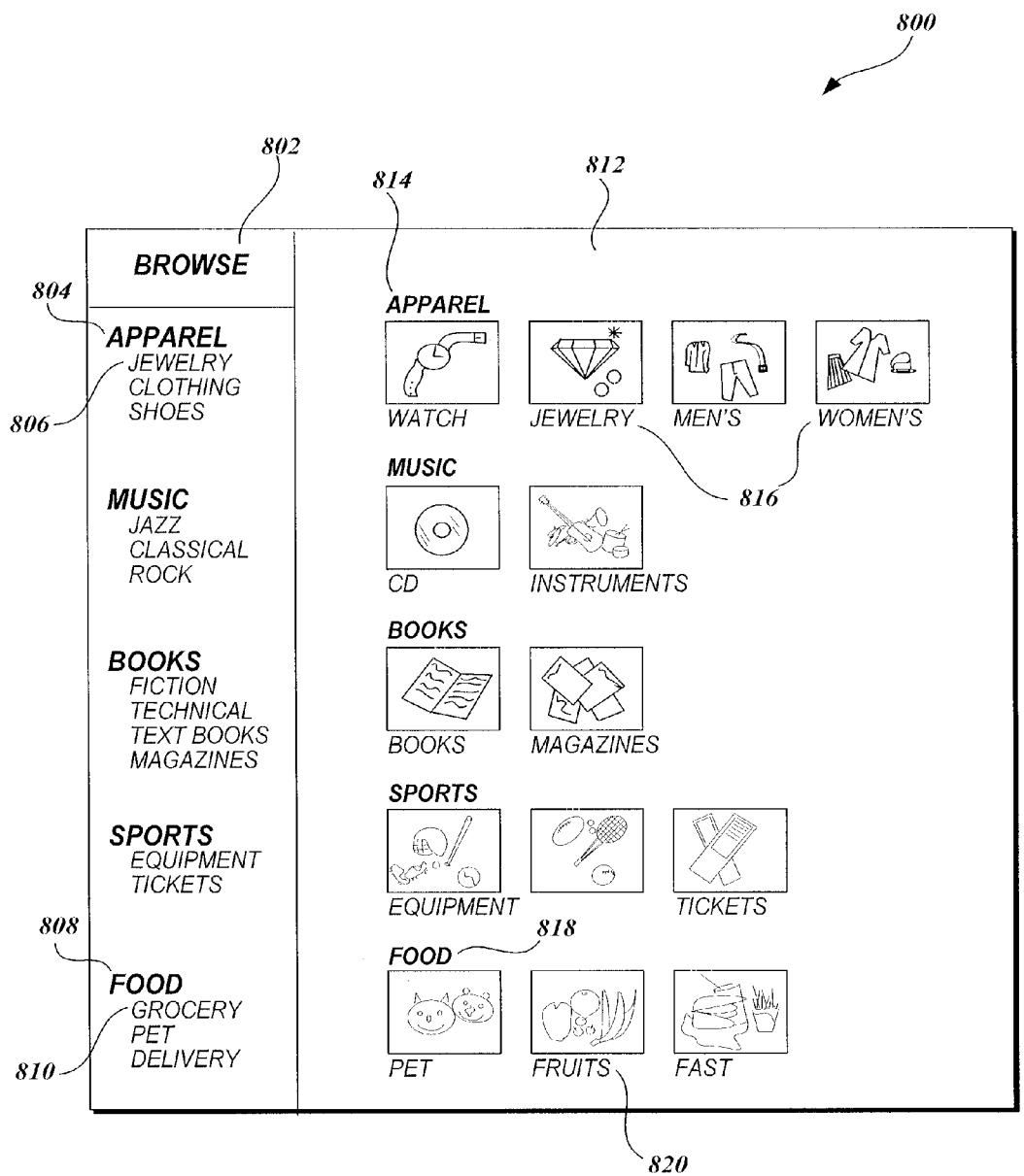
FIG. 8 is a pictorial diagram of a sample user interface display including a browse menu and a display area for displaying several item categories.

For example, and with reference to FIG. 8, the user may have selected a browse node for the "Food" item category by clicking the hyperlink associated with the "Food" browse node 808 in user interface ("UI") 800. In response, the server issues a query to the data store 102 for data regarding the items categorized in the "Food" browse node, including the attributes corresponding to the "Food" browse node. In response to the request, the data store 102 provides the data including the corresponding attributes to the server 104. As discussed in more detail below, the browse node attributes can be customized for display according to clickstream analysis, other learning techniques, and/or user or group preferences. This customization can be performed by the server 104 or by code on the client device 108. For example, a service running on the server or a script on the client device 108 could customize the browse node attributes.

Once the server 104 obtains the attributes corresponding to the first browse node from the data store 102, the server 104 transmits the data regarding the items in the first browse node, including the attributes corresponding to the first browse node, to the client device 108 via the communications network 106. The user-interface component 110 of the client device 108 processes the data to construct a user interface, such as a Web page, that displays the items categorized in the selected browse node and the associated browse node attributes. Such a user interface 900 is illustrated in FIG. 9, which will be described in more detail below.

As will be discussed more fully below with respect to FIGS. 6A-12, when the user selects a second node, some of the attributes or attribute values may be removed and/or changed if the second node is not a direct descendant of the first note. However, as described below with respect to FIG. 2B, if the second node is a child node of the first node, then all attributes used for the first node are applicable.

Figure 2B:
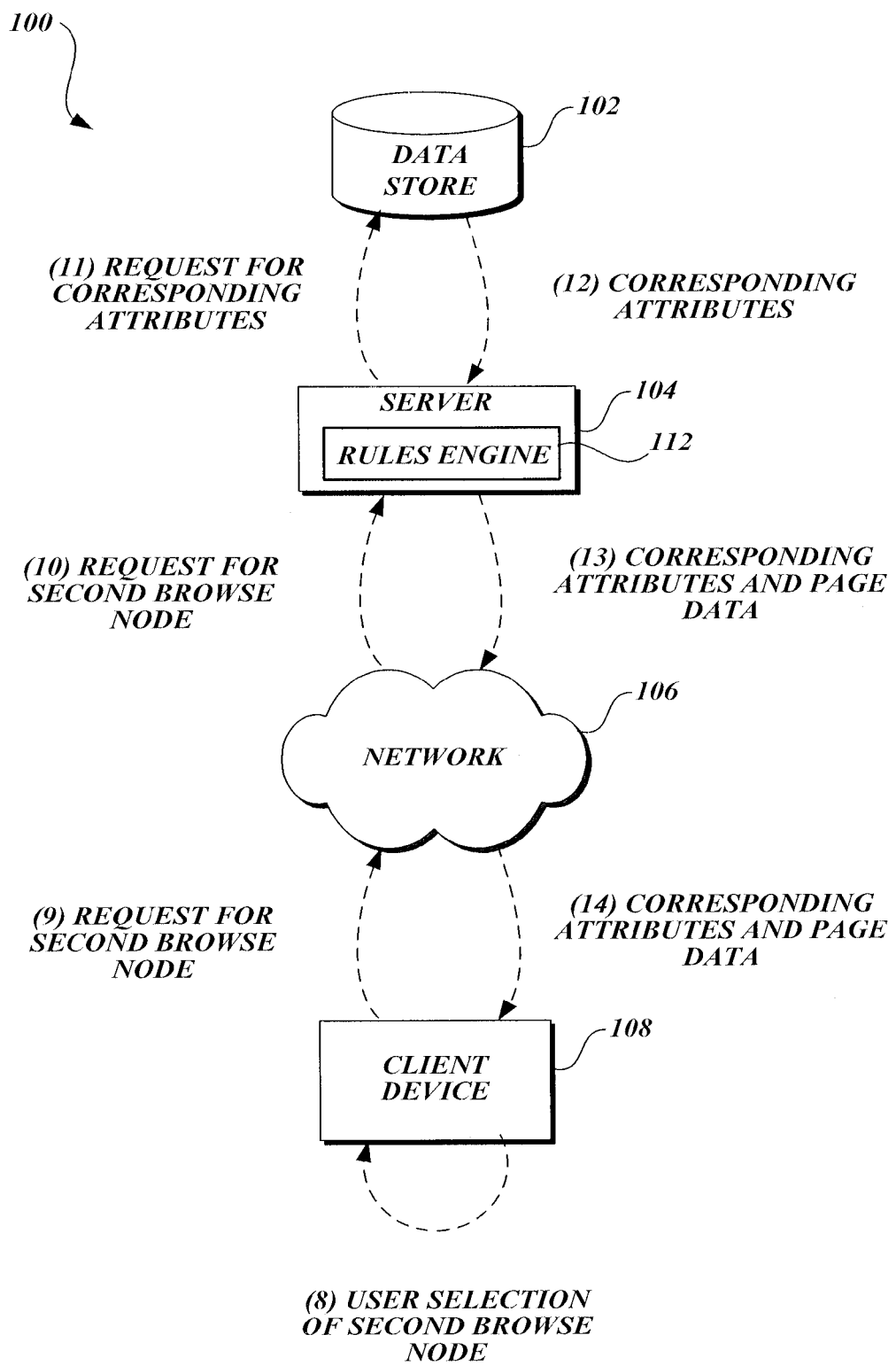
FIG. 2B is a block diagram of an illustrative client device request for a second browse node and corresponding attributes from the server and data store shown in FIG. 1.

With reference now to FIG. 2B, the interaction by various components of the operating environment 100 to provide browse node attributes corresponding to a second browse node that is a child node of the first browse node will be described. As illustrated in FIG. 2B, a user may select a second browse node associated with a sub-category of items. For example, the second browse node could be selected by clicking its associated hyperlink on a Web page displaying the items categorized in the first browse node. In response, the client device 108 issues a request for the second browse node via the communications network 106. The server 104 receives the request and issues a query to the data store 102 for data regarding the items categorized in the second browse node, including the attributes which correspond to the second browse node.

Figure 9:
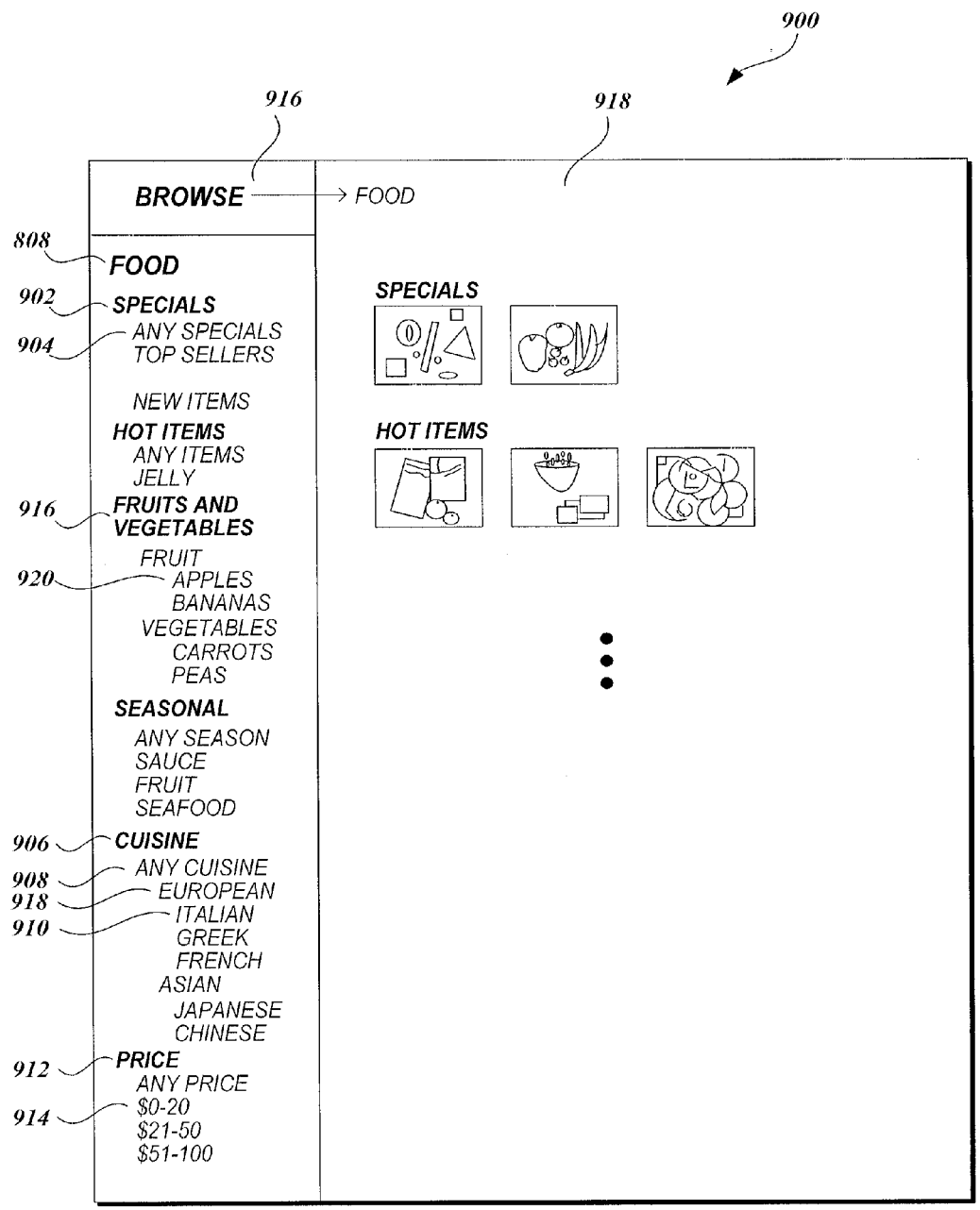
FIG. 9 is a pictorial diagram of an illustrative user interface display including a browse menu and an arrangement of attributes corresponding to gourmet food coded browse nodes.

For example and with reference to FIG. 9, the user may have selected a browse node for a "Fruits & Vegetables" sub-category of the category "Food" by clicking the hyperlink for the "Fruits & Vegetables" browse node 916 in UI 900. In response, the server issues a query to the data store 102 for data regarding the items categorized in the "Fruits & Vegetables" browse node, including the attributes corresponding to the "Fruits & Vegetables" browse node. In response to the query, the data store 102 provides the data including the corresponding attributes to the server 104. As discussed in more detail below, the browse node attributes can be customized for display according to clickstream analysis, other learning techniques, and/or user or group preferences. This customization can be performed by the server 104 or by code on the client device 108.

Figure 10:
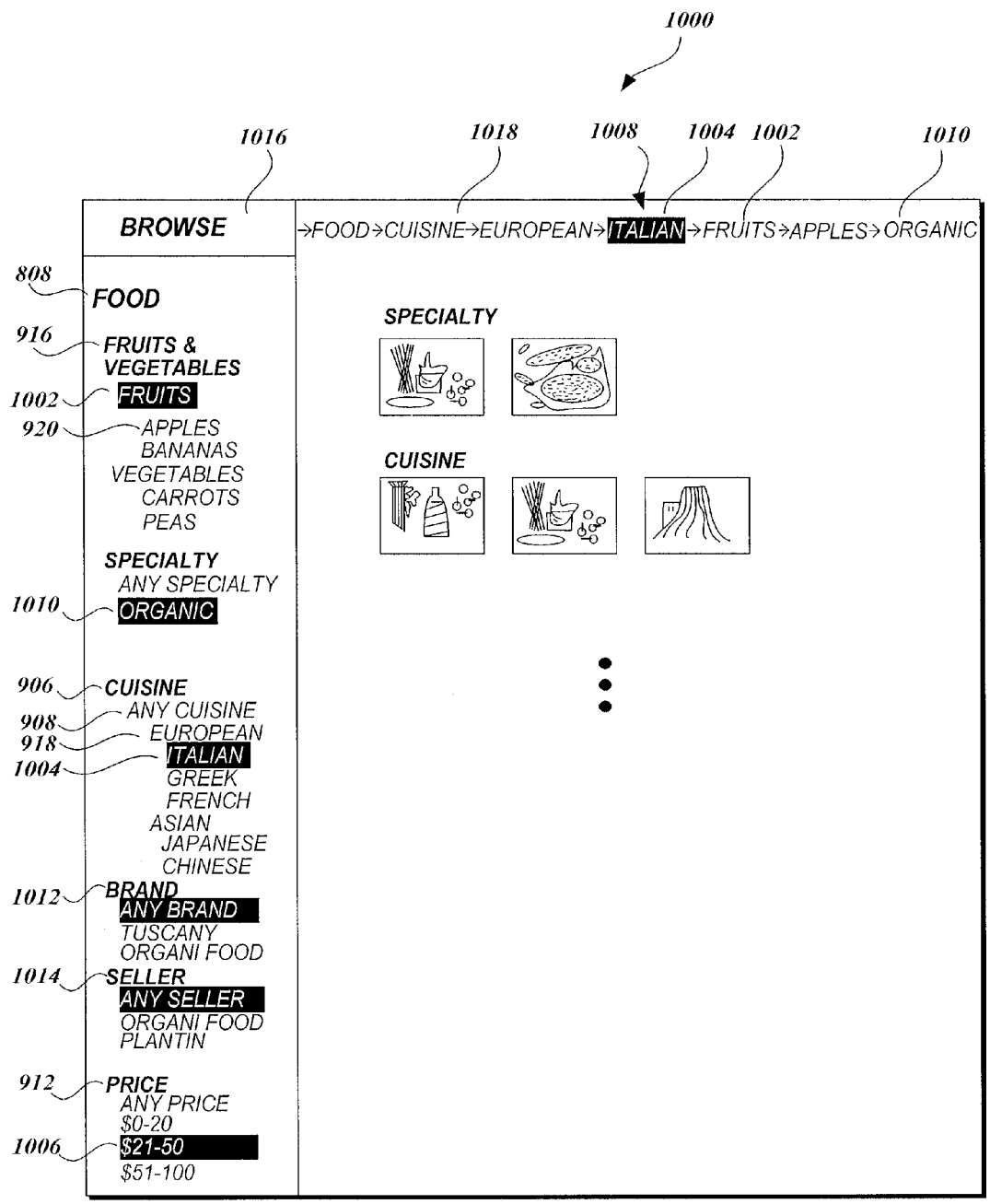
FIG. 10 is a pictorial diagram of an illustrative user interface display including a browse menu and an arrangement of attributes corresponding to organic food from one region of origin.
Figure 11:
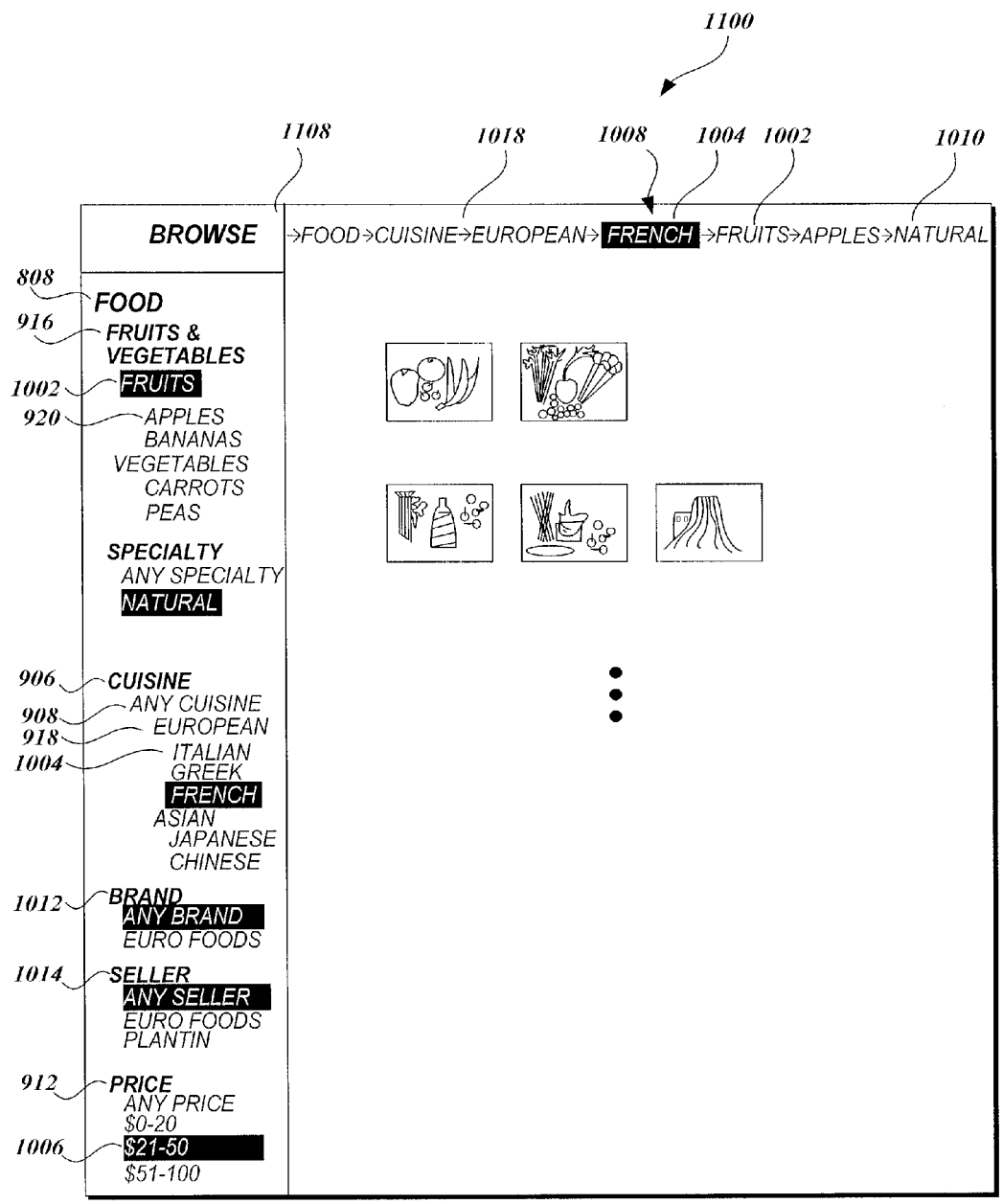
FIG. 11 is a pictorial diagram of an illustrative user interface display including a browse menu and an arrangement of attributes corresponding to natural food from a region of origin different from that of FIG. 10.
Figure 12:
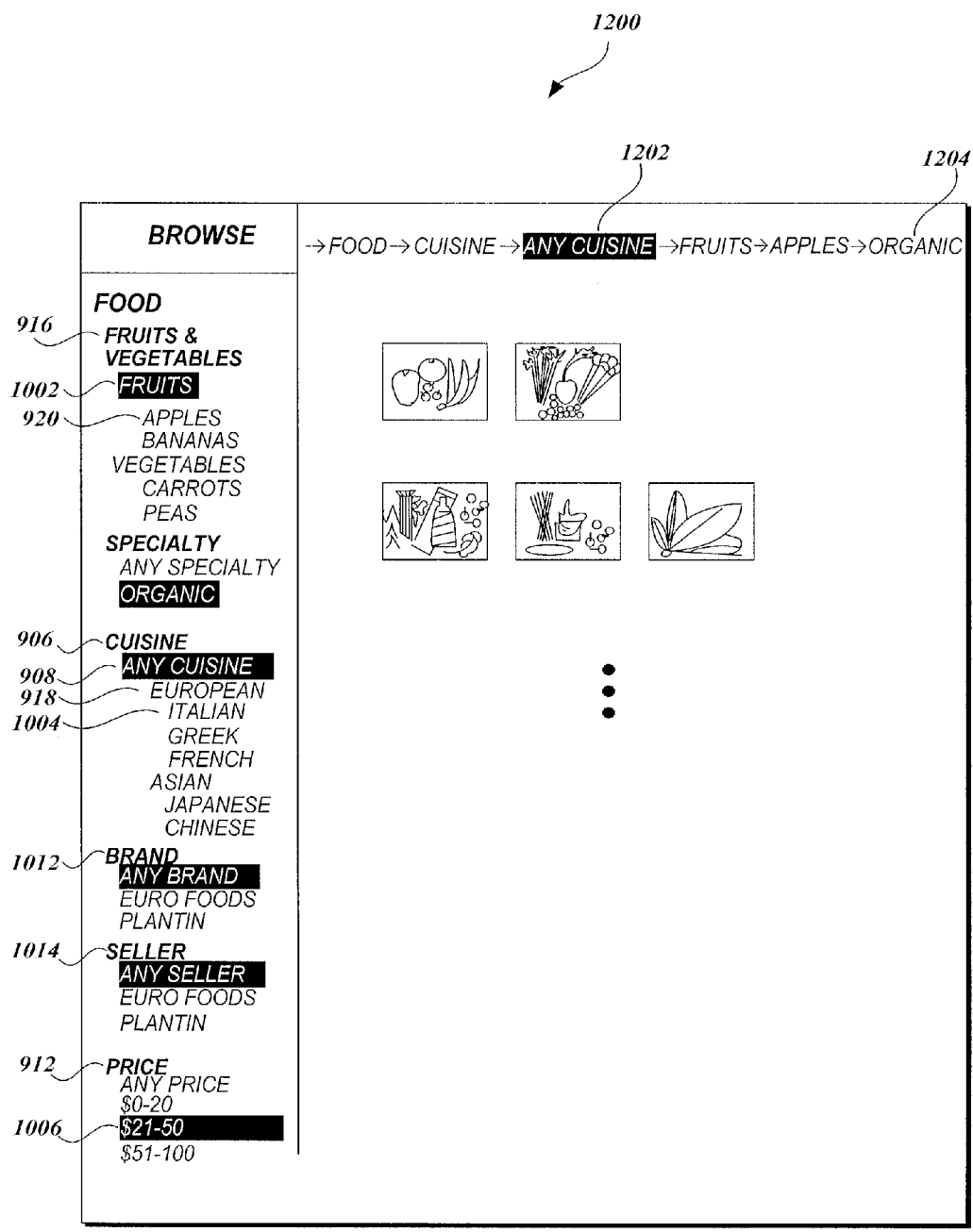
FIG. 12 is a pictorial diagram of an illustrative user interface display including a browse menu and an arrangement of attributes corresponding to organic food from any region of origin.

Once the server 104 obtains the attributes corresponding to the second browse node from the data store 102, the server 104 transmits data regarding the items in the second browse node, including the attributes corresponding to the second browse node, to the client device 108 via the communications network 106. The user-interface component 110 of the client device 108 processes the data to construct a user interface, such as a Web page, that displays the items categorized in the second browse node and the associated browse node attributes. Such a user interface 1000 is illustrated in FIG. 10, which is described in more detail below.

Figure 3:
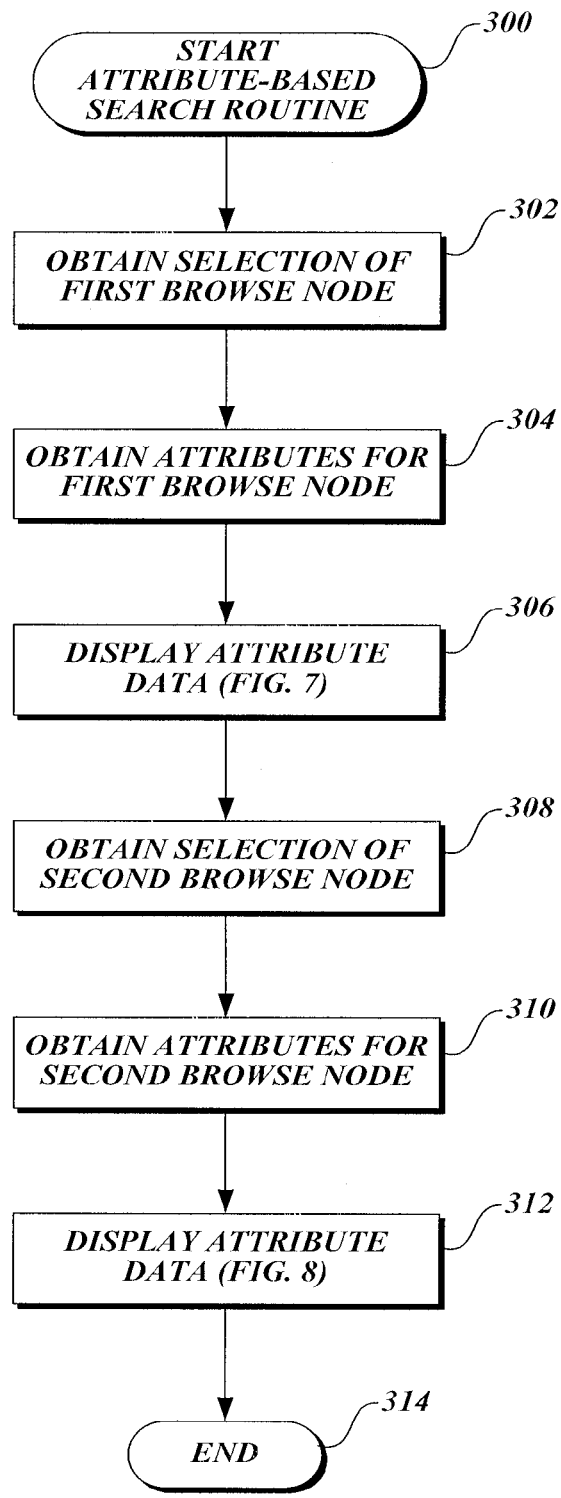
FIG. 3 is a flow diagram of a sample attribute-based search routine implemented by the client device shown in FIG. 1.

With reference now to FIG. 3, a flow diagram illustrative of a sample attribute-based search routine implemented by the client device 108 will be described. At block 302, a selection of a first browse node is obtained from a user. As explained above, a user can select a first browse node by clicking a hyperlink associated with the browse node on a Web page. For example, referring to FIG. 8, a user can select the "Food" browse node 808 by clicking on an associated hyperlink. At block 304, data associated with the first browse node, including corresponding attributes, are obtained from the data store 102. More specifically, in one embodiment, the client device 108 transmits a request for browse node data including corresponding attributes to the server 104 via the network 106. In response, the server 104 returns the browse node data including corresponding attributes. At block 306, the client device 108 processes the data and constructs a user interface, such as a Web page, that displays the items categorized in the first browse node and the associated browse node attributes. Continuing with the example above, if the user has selected the "Food" browse node 808, then the client device 108 displays a Web user interface 900 as depicted in FIG. 9 that includes more sub-categories and items related to the "Food" category. FIG. 9 will be described in more detail below.

At block 308, a selection of a second browse node, i.e., a child node of the first or "parent" node can be obtained from a user. As described below, a user can select a second browse node by clicking a hyperlink associated with a browse node in a Web page. For example, referring to FIG. 9, a user can select the "Fruits & Vegetables" browse node 916 wherein the "Fruits & Vegetables" browse node is a child node of the "Food" browse node 808, and thus, represents a sub-category of the "Food" category. In the illustrated embodiment, the "Fruits & Vegetables" browse node 916 can appear as a hyperlink within the UI 900 corresponding to the "Food" browse node.

Returning to FIG. 3, block 310 attributes corresponding to the second browse node are obtained. For example, the client device 108 transmits a request to the server 104 for browse node data, including attributes corresponding to the second browse node. In response, the server 104 transmits the corresponding attributes to the client device 108. At block 312, the attributes corresponding to the second browse node are displayed. Continuing with the example above, if the user has selected the "Fruits & Vegetables" browse node 916, then the client device 108 displays a UI 1000 as depicted in FIG. 10 that includes attributes related to the items categorized in the "Fruits & Vegetables" browse node, e.g., "Cuisine," "Price," etc. FIG. 10 will be described in more detail below. At block 314, the attribute-based search routine ends. Although, flow chart 300 only depicts the selection and display of attribute data corresponding to a first and second browse node, it will be appreciated that a user can navigate through any number of browse nodes within the browse tree and at any depth in the browse tree until an ultimate leaf node is found.

Figure 4:
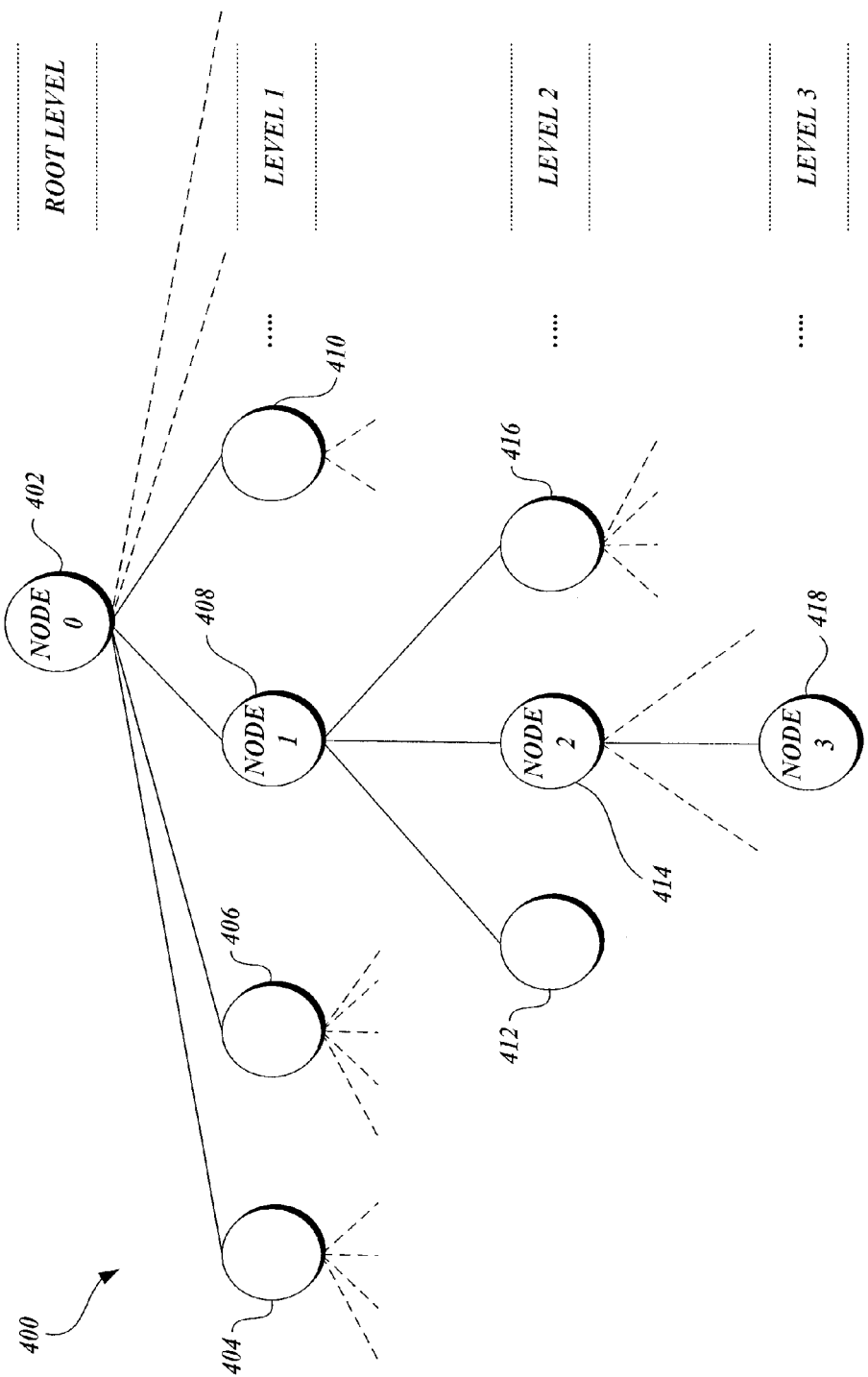
FIG. 4 is a block diagram of a sample tree-structure representing a hierarchical arrangement of browse nodes formed in accordance with an aspect of the present disclosure.

With reference now to FIG. 4, a browse tree-structure 400 representative of a hierarchical arrangement of browse nodes will be described in more detail. An illustrative arrangement of browse nodes may contain four levels. However, it will be appreciated by one skilled in the art that an arrangement of browse nodes can span any number of levels. The root level of the tree structure may correspond to a single browse node 402 representing all or a subset of items in an electronic catalog. Further, in the illustrated embodiment, each browse node can be displayed in a Web page. For example, the items categorized in browse node 408 associated with "Food" category 808 are displayed in UI 900 depicted in FIG. 9. However, in other embodiments, the browse node may be displayed in another type of user interface. For example, items categorized in a browse node may be displayed in different menus or may be delivered as voice prompts within a telephonic prompting system. Accordingly, any type of system which facilitates user interaction can be used.

In the illustrated embodiment, to reach a browse node on Level One, a user can select a hyperlink associated with a Level One child node from a Web page or other user interface associated with the root-level browse node. For example, the contents of browse node 408 associated with the Food category are displayed in Web UI 900 depicted in FIG. 9. Accordingly, hyperlinks to each of the Level One child nodes are displayed in UI 900. A user can then select a hyperlink corresponding to the browse node 414 associated with the "Fruits & Vegetables" category, which in turn causes the Web UI 800 depicted in FIG. 10 to be displayed. In the illustrated embodiment, there are several browse nodes 404, 406, 408, and 410 within Level One of the tree structure. As will be described in more detail below, each of the Level One browse nodes 404, 406, 408, and 410 may have associated attributes that are common to all of the items of browse node. For example, FIG. 10 depicts sample attributes, such as "Brand" 1012 and "Price" 912, which are common across all Food items. If another link to a Level One browse node had been selected, such as "Seafood," a different set of attributes may be displayed if the attributes common to all seafood are different than the attributes common to fruits & vegetables.

Figure 5:
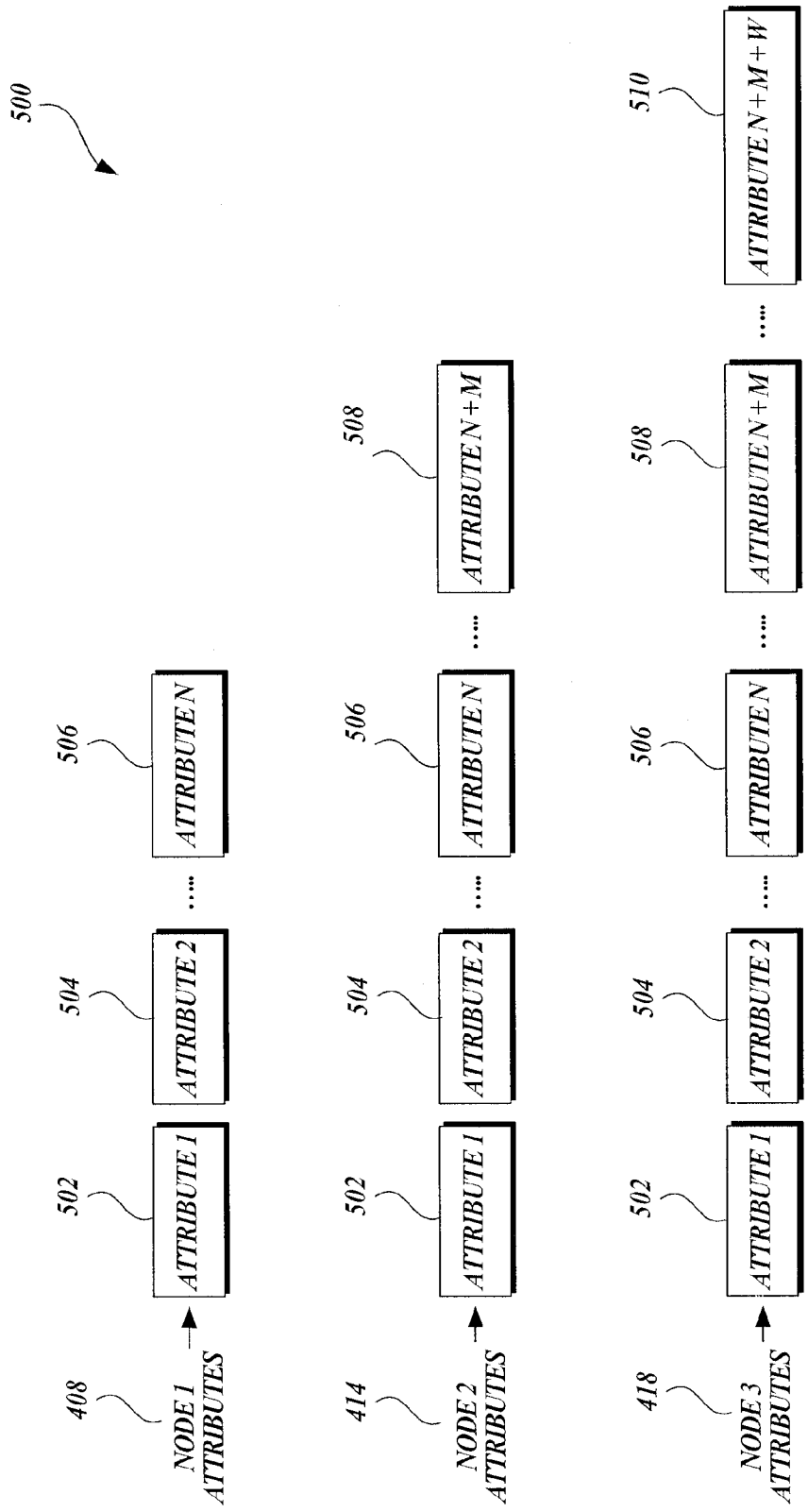
FIG. 5 is a block diagram depicting the inheritance of attribute data in a child node from a parent node in the tree shown in FIG. 4.

With reference now to FIG. 5, attribute data 500 corresponding to various browse nodes of the browse node tree 400 will be described. Node 1 408 from Level One of the browse tree 400 can include a first attribute 502, a second attribute 504, and on up to an Nth attribute 506. It will be appreciated that there is no limit to the number of attributes that can be associated with a browse node. Node 2 414 from Level Two of the browse tree 400 inherits the first N attributes common to node 1 408, and also includes attributes up to and including an N+Mth attribute 508. Thus, there can be more attributes associated with node 2 414 than are associated with node 1 408.

Node 3 418 from Level Three of the browse tree 408 inherits the first N attributes common to node 1 408, the first N+Mth attributes 508 common to node 2 414, and also includes attributes up to and including an N+M+Wth attribute 510. Thus, there can be more attributes associated with node 3 418 than are associated with either node 1 408 or node 2 414. It will be appreciated that as a user continues to narrow his or her search by selecting browse nodes at lower and lower levels of the browse tree, the number of attributes displayed will increase because there are more common characteristics amongst products in the narrower sub-categories. Furthermore, although navigation was described with reference from going from one level to the next lower level, in some embodiments, nodes on a certain level or levels could be skipped. In addition, if more than one browse tree exists, a user may navigate from one browse tree to another. In such cases, the attributes from the browse node from which the user navigated may be displayed along with the attributes of the browse node to which the user has navigated.

In one illustrative embodiment, multiple browse trees may be associated together to form one tree, such as a product tree. The user may navigate various parts of the product tree via links between the multiple trees associated together, as further discussed below with reference to FIGS. 6A and 6B.

Attributes corresponding to a browse node can be static or dynamic. If the attribute is static, each user accessing the node will see the same attributes. If the attribute is dynamic, each user accessing the node may see different attributes. For example, clickstream analysis can be used to customize the attributes according to a user's browsing habits. For example, browse node attributes may be determined based on clickstream analysis or other learning techniques. As will be appreciated by one skilled in the art, a clickstream is a path a user takes while browsing a Web site. Each distinct selection made on a Web page adds one click to the stream. Accordingly, analysis of clickstream data may reveal which attributes a user more commonly associates with a category. For example, if the category is "Fruits & Vegetables," possible attributes may include "Organic" and "Price." Further, narrowing of the types of products displayed can occur when a user chooses to narrow according to a specific attribute. By using clickstream analysis, it may be determined that users choose to narrow according to "Organic" significantly more than they choose to narrow according to "Price." Thus, because "Organic" appears to be a much more important attribute than "Price," the system 100 may choose to remove or to not display the "Price" attribute for this category. Alternatively, the "Organic" attribute could be displayed more prominently on the display. This technique may be useful if the number of appropriate attributes is larger than the number of attributes that can be displayed on a user interface.

Other learning techniques can be used to determine which attributes to display. For example, instead of displaying attributes based on the browsing behavior of all users, attribute data can be displayed according to the preferences or characteristics of a single user or group of users. The user or group of users can be tracked to determine which attributes they would most like to view. Alternatively, the user or group of users can choose which attributes the user or group of users would like to view. Furthermore, a user can choose to prioritize the display of attributes. For example, a user may choose to have a "Organic" attribute displayed before a "Price" attribute. Display of attributes based on clickstream analysis and other learning techniques will be described in more detail below.

If a user often narrows based on the same attributes, other attributes that appear to be less interesting to the user can be hidden from view or not retrieved from the data store 102. Furthermore, attribute data can be customized according to the type of browsing device or the type of display device. For example, a user browsing attribute data over a mobile phone may only be able to see a subset of the attribute data that is available. Thus, few attributes may be displayed to a user browsing with client device 108 that is a mobile phone. Likewise, if a user has a small display, fewer attributes may be displayed. Various colors can also be used to draw attention to or away from certain attributes.

Figure 6A:
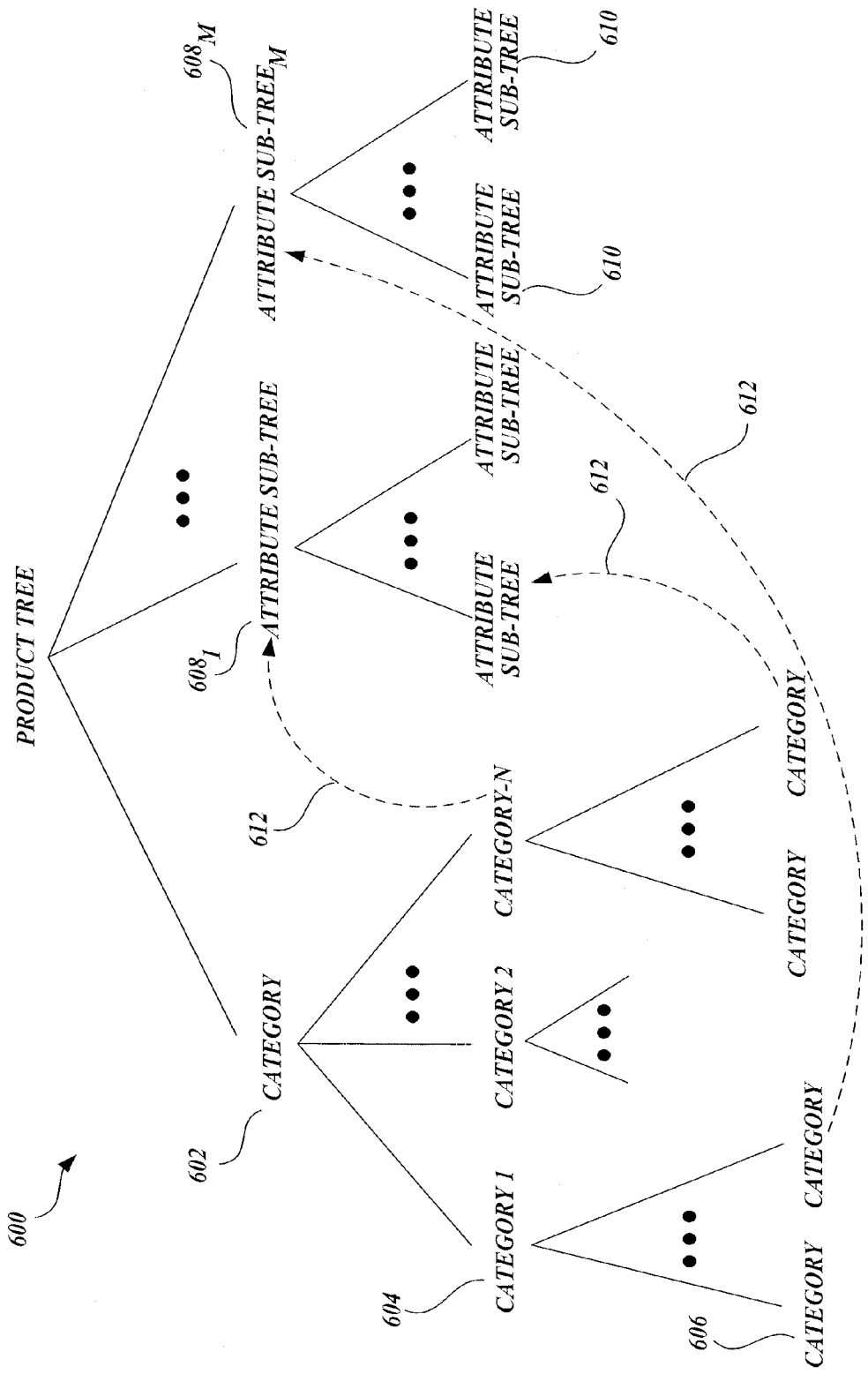
FIG. 6A is a pictorial diagram of an illustrative product tree including category sub-trees and attribute sub-trees.

With reference now to FIG. 6A, an illustrative embodiment of a product tree 600 is shown including a main category sub-tree 602 and attribute sub-trees 608. As noted above with respect to FIG. 5, and further discussed below, the product tree may be constructed by associating multiple browse trees or sub-trees. The main category sub-tree 602 includes multiple category sub-trees 604, which include lower-level sub-category sub-trees 606, such as products and/or services available to users. The attribute sub-trees 608 include attributes associated with one or more of the categories 604 or sub-categories 606, through which the attributes are ultimately also associated with products or items that belong to such categories 604 or sub-categories 606. The attribute sub-trees 608 may include other lower-level attribute sub-trees 610. As discussed above with respect to FIGS. 3-5, the product tree may include categories 604, such as "Food," "Electronics," "Books," etc., while sub-categories 606, may include, for example, "Fruits & Vegetables," "Cameras," and "Technical books," etc., respectively. The attribute sub-trees 608 generally include attributes common to several categories or sub-categories. For example, a attribute sub-tree 608 or lower-level attribute sub-tree 610 may include "Price," "Material" (for example, silver, gold, or platinum used in jewelry), "Manufacturer," etc. Such attributes may be related to more than one category or sub-category. For example, every category may include the "Price" attribute in a commercial merchandising environment.

Those skilled in the art will appreciate that the categories 604 and sub-categories 606 are classified based on certain attributes which may be the same as some of the attributes in the attribute sub-trees 608. For example, an attribute relating to the origin of a food item may also be a basis for the classification of the food item in the category 604 or sub-category 606. The "Italian" attribute can indicate both a sub-category of a food item as well as a refinement used in search. In one illustrative embodiment, the attributes used for categorization of items are pre-selected to be different from the attributes used in attribute sub-trees 608. In another illustrative embodiment, the attributes used for categorization of items include some of the attributes used in search refinement. In turn, each attribute in the attribute sub-trees 608 includes a range or an enumeration of predetermined values associated with that attribute. For example, the attribute "Price" may include values as dollar ranges, such as "$1-$20," "$21-$50," "$51-$100," etc. As an example of enumeration values, the attribute "Cuisine" may include "European," "Asian," etc., and in turn," European may include "Italian," "French," etc. Those skilled in the art will appreciate that while enumeration values are generally predefined for selection by the user (for example, from a drop-down pick-list on a Web page), other attribute values may include other types of values such as numerical or text values entered by the user. For example, an attribute "date of production" may include any valid date entered by the user.

The association between the categories 604 and/or sub-categories 606 and the attribute sub-trees 608 and lower-level attribute sub-trees 610 may be created in different ways. In one illustrative embodiment, hyperlinks 612 may be used in Web pages to access attribute sub-trees 608 and attributes included therein. In another illustrative embodiment, associative tables may be used to associate a attribute sub-tree 608 with a category 604 or sub-category 606 of items. Those skilled in the art will appreciate that this association may take many other forms without departing from the spirit of the present disclosures. As indicated above, this association may be many-to-many. That is, each category 604 or sub-category 606 may be associated with multiple attribute sub-trees 608 or lower-level attribute sub-trees 610, and vice versa. This many-to-many association between category 602 and attribute sub-trees 608 allows reuse of category and attribute sub-trees, reducing the overall cost and complexity of the system. Additionally, this arrangement allows quick development and deployment of new category and attribute sub-trees for introduction of new items by the service provider providing the electronic catalog. A new item or category may be associated with existing attributes, while existing items or categories may be associated with a new attribute. Having multiple independent sub-trees, for categories of items, as well as attributes for refinement of searches, in effect, creates a modular system of multiple sub-trees that may be mixed and matched quickly, rather than building individual deep product trees for each category of items.

Figure 6B:
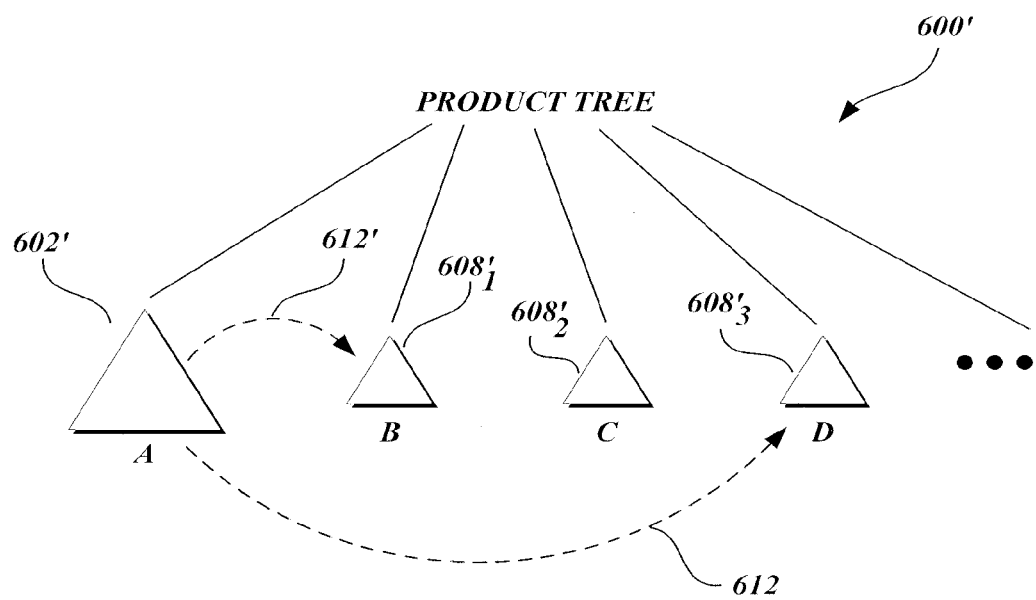
FIG. 6B is a pictorial diagram of the product tree of FIG. 6A shown in abbreviated form.
Figure 7:
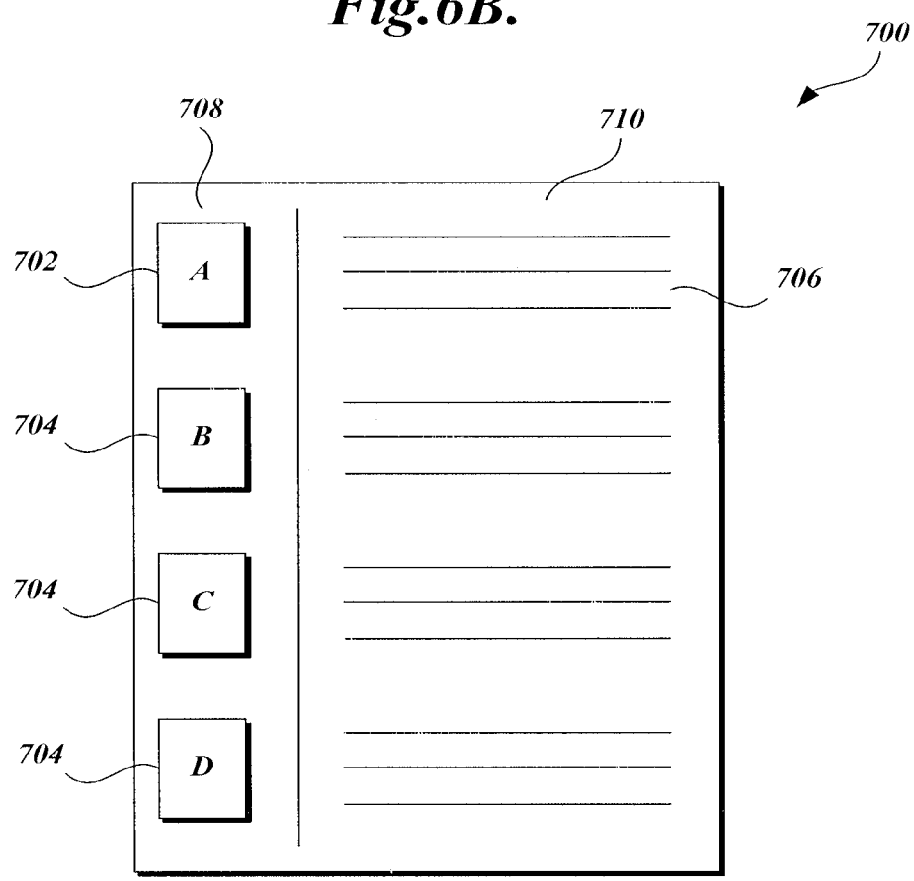
FIG. 7 is a pictorial diagram of a sample user interface display depicting the correspondence between the user interface and the product tree and sub-trees shown in FIG. 6B.

FIG. 6B is a short-hand form of depicting the product tree 600' of FIG. 6A for ease of reference. With reference to FIG. 6B, the main category sub-tree A 602' is linked to (or associated) with attribute sub-trees 608' via different links 612'. Using this short-hand representation of complex product trees allows easy mapping of the product tree 600' and its category and attribute sub-trees to a UI 700, such as the one depicted in FIG. 7. In one illustrative embodiment, a browse section 708 of the UI 700 may be used to depict the product tree 600' in a hierarchical tree structure, while a results section 710 of the UI 700 is used to present detailed category or item information, such as attribute values and images 706. In this embodiment, the browse section 708 includes category sub-trees 604 and 606, as well as attribute sub-trees 608 and 610, depicted, for example, as blocks A 702 and B-D 704, respectively. More detailed descriptions of illustrative embodiments of the UI 700 follow with respect to FIGS. 8-12 below.

With reference to FIG. 8, an illustrative embodiment of the more detailed UI 800 includes a browse section 802 and a results section 812. A user, shopping and/or browsing for various items, presented with such a UI 800 may start browsing at a top level of the product tree 600, where the browse section 802 includes the main category sub-tree 602. Typically, at this high level, the product categories are too diverse to have many common attributes, as noted above. For example, the main category sub-tree 602 may include Level 1 categories 804, such as "Apparel," "Music," "Books," "Food," etc. "Apparel" category has little in common with "Music" or "Books" categories and thus, few, if any, common attributes are presented at this level. However, sub-categories 806, such as "Clothing" or "Shoes" for the "Apparel" category may be presented to the user at this level. The user may select a particular category at this level, such as "Food." In response to the user's selection, the information presented via a UI 900 is updated to include a lower level, more specific node in the product tree. Continuing with the example above, FIG. 9 illustrates information corresponding to a lower level node in the product tree 600. In this example, a "Food" category 808 corresponds to a "Food" category of items in the product tree. Sub-categories include "Specials" 902, "Fruits & Vegetables" 916, etc. The attribute sub-trees 608 are represented in the UI 900 as attributes "Brand" 1012, "Price" 912, etc. Values of these attributes in turn include "Any Brand," "Tuscany," etc. for the "Brand" 1012 attribute, and "$0-20" 914 price range, etc., for the "Price" 912 attribute. As the user selects various sub-categories and/or attribute values, items and/or sub-categories corresponding to the user selections appear in the results section 812 of the UI 900. For example, if the user selects "Specials" 902 as the sub-category 604, "Any Special" 904 as the sub-category 606, and price range "$0-20" 914 as the value for the "Price" 912 attribute, items and other sub-categories, if any, matching these user selections appear in the results section 812.

Further continuing with the above example, FIG. 10 illustrates the next lower level node in the product tree 600. In one illustrative embodiment, an indication of the current node in the product tree 600 in the form of a path 1008 is presented so user knows the current position of his search within the product tree 600. In this example, the user has chosen the sub-category "Organic" 1010 within another sub-category "Apples" 920 within the sub-category "Fruits" 1002, yet within another sub-category "Italian" 1004, yet within another sub-category "European" 918. The attributes selected for refinement of search in this example include the "Price" attribute 912 with attribute value "$21-50" 1006. Other attributes such as "Brand" 1012 and "Seller" 1014 may be unselected to default to a predetermined value (for example, "Any Brand" or "Any Seller") and match any sub-category and item for these unselected attributes. Having a modular system with multiple independent attribute sub-trees 608 that may be associated with multiple sub-categories 604 and 606 allows maintaining the user's selection of the attribute values across different searches for different items or sub-categories that share the selected attributes. For example, if the user next selects "French" sub-category of "Food" 808, the selected value "$21-50" 1006 of the "Price" attribute 912 is maintained by the system and the user does not have to reselect this price range for his new search of French foods. This is because "Price" is an attribute common to both "Italian" and "French" sub-categories.

Attribute and corresponding attribute values, in effect, provide a filtering system for refinement of search. As particular values are selected for attributes, data retrieved from a database and presented in the results section 812 are filtered to include those results that satisfy the selected attribute values. For example, if the "$21-50" 1006 value is selected for the "Price" attribute, the items retrieved include only those items the price attribute of which falls within the selected value range of $21-50, filtering out items outside this price range.

Having multiple independent sub-trees also allows context-dependent search and data selection. The context is defined by the existence of association between attribute sub-trees 608 and categories 604 or sub-categories 606. Having information about such associations reduces or eliminates the need to re-enter data already entered in the same context in searches for other similar items. The context information is also useful for displaying appropriate information in the UI. Specifically, for a selected category 604, sub-category 606, or item only attribute sub-trees 608 and attributes included therein that are associated with such selected category 604, sub-category 606, or item, are presented to the user for further refinement of search and/or selection of items. For example, if in one search the user is searching for shoes, then a "Size" attribute is appropriate and is displayed, while in another search if the user is searching for books, then a "Size" attribute is not appropriate and is not displayed. Thus, the system maintains a consistent search context and displays appropriate information to the user.

In one illustrative embodiment, the association between attribute sub-trees 608 and categories 604 or sub-categories 606, is created using a rules engine 112. The rules engine 112 executes rules that determine, based on pre-defined attribute-category relationships, whether attributes in a pre-defined attribute sub-tree 608 may be associated with a category 604 or sub-category 606. The attribute-category relationships may be defined manually, for example, by defining that categories having a "Wearable" attribute must also have a size attribute. If a "Men" sub-category 606 is in an "Apparel" category 604, then, by applying a rule, it may be determined that a "Size" attribute sub-tree 608 including various size-related attributes, such as "Shoe Size," "hat size," etc., may be appropriately associated with the sub-category 606. In another illustrative embodiment, the association between attribute sub-trees 608 and categories 604, sub-categories 606, and items included therein, is created manually. Those skilled in the art will appreciate that such associations may be created in other ways, such as by using a combination of a rules engine 112 and manual processing.

Having multiple independent sub-trees also allows pivoting of search about different categories and/or attributes. Pivoting is the act of focusing on one category and/or attribute as a selection anchor point while maintaining or updating other categories and/or attributes with respect to the anchor point. Pivoting is made possible because the associations between the selection anchor attribute and other attributes are known and states of the attributes in the multiple attribute sub-trees 608 may be maintained independently across different searches and related categories. That is, when a different category 604 or sub-category 606 is selected by the user, all the associated attributes and related sub-categories 606 need not be changed, because the sub-trees are not part of a single product tree, but rather, are independent sub-trees that may be associated with multiple other sub-trees, as discussed above. For example, with reference to FIGS. 10 and 11, the user may first select Italian organic foods in the price range of $21-50 having any brand and from any seller. Subsequently, the user may select French natural foods with the same price range, brand, and seller. In such case, the user only changes the "European" 918 attribute from value "Italian" 1004 to "French" 1106, while all other attributes and sub-categories stay the same. The pivoting is performed about the "European" 918 attribute as the anchor attribute while all other attributes that are applicable to the new selection are maintained from the previous selection. Alternatively, the user may have selected a different attribute value for "Brand" 1012 (for example, "OrganiFood") as the anchor attribute while other attributes and/or categories remained unchanged.

Selecting a particular anchor attribute and/or category may also change other associated attributes, and/or the values of such attributes, because a second category selected by the user may not be associated with the same attributes or have the same values as a first category previously selected by the user. For example, if a user's first selection is "Fruit" as a sub-category, and his second selection is "Seafood," the other applicable sub-categories, attributes, and attribute values may be different. Values of "Price" attribute 912 may be different for the two selections. And "Seafood" may not have an "Organic" 1010 sub-category, while "Fruit" may.

Another aspect of having multiple independent sub-trees flexibility is order of selection of sub-categories and/or items included therein. Because the product tree 600 is not a single data structure, but a hierarchical linked tree composed of a collection of independent sub-trees linked together by links 612, the user may have multiple simultaneous paths for traversing the product tree. This is in contrast with a single tree where nodes are connected only through the hierarchical structure. In the modular product tree 600, some nodes are connected together via two different types of paths: (1) the hierarchical node structure where each node is connected to its parents and children, and (2) links 612 associating some nodes with other nodes, as illustrated in FIG. 6. Having a tree structure thus connected makes entry and exit from a node, or traversal of the tree, more flexible. As noted above, traversing a simple hierarchical tree is only possible through the hierarchical structure from child to parent node and vice versa, whereas traversing a hierarchical linked tree, like the product tree 600, is possible both by traversing nodes between parent and child nodes, and by using the links to jump to other nodes in other sub-trees. For example, with reference to FIGS. 9-12, to change an item category from "Fruits" 1002 to "Fruits & Vegetables" 916, a user does not have to traverse all the way up the product tree to "Food" 808 sub-category through several layers, such as "Cuisine," "Price," "Brand," etc. and then traverse back down through similar layers to "Fruits & Vegetables" 916. The user can simply go up one level to "Food" 808, and then select "Fruits & Vegetables" 916, while all other attributes and/or sub-categories remain the same to the extent applicable to the new selection.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

While illustrative embodiments have been illustrated and described, it will be appreciated that various changes can be made therein without departing from the spirit and scope of the invention.

What is claimed is:

1. A computer-implemented system for displaying information, the system comprising:
   a data store for storing information about:
      category hierarchies associated with items, the category hierarchies constituting a first sub-portion of a product hierarchy, and
      attribute hierarchies including attributes, the attribute hierarchies constituting a second sub-portion of the product hierarchy, the category hierarchies being distinct in the product hierarchy from the attribute hierarchies;
   a rules engine associating the attribute hierarchies with the items in the category hierarchies according to attribute assignment rules, wherein each attribute in each attribute hierarchy includes at least one attribute value; and a server computing device for generating a hierarchical user interface ("UI") wherein the server computing device:
identifies at least two attribute hierarchies which have been associated with the items in the category hierarchies by the rules engine, each attribute in each identified attribute hierarchy containing at least one attribute value associated with the items in the category hierarchies;
determines a prioritization of individual attribute hierarchies within the identified at least two attribute hierarchies; and
determines a subset of the identified at least two attribute hierarchies, the determination based at least in part on the determined prioritization;
wherein the UI includes:
a representation of the category hierarchies; and
a representation of the determined subset of the identified at least two attribute hierarchies; and
wherein the server computing device, in response to a selection of an attribute value, causes:
removal from the UI of representation of items not associated with an attribute having the attribute value,
removal from the UI of at least one attribute hierarchy of said subset, said at least one attribute hierarchy determined based at least in part on the determined prioritization of the individual attribute hierarchies within the identified at least two attribute hierarchies, and
display in the UI of representation of items associated with the attribute having the attribute value.

2. The system of claim 1, wherein the category hierarchies include at least one category of items, the category including at least one sub-category of items.

3. The system of claim 1, wherein the UI includes links between the representation of category hierarchies and the first subset of attribute hierarchies.

4. The system of claim 1, wherein each category hierarchy is associated with a plurality of attribute hierarchies.

5. The system of claim 1, wherein each attribute hierarchy is associated with a plurality of category hierarchies.

6. The system of claim 1, wherein a new category is displayed on the UI associating the new category with at least one of the attributes and assigning an attribute value to the new category.

7. A computer-implemented method for displaying information related to items, the method comprising:
in response to a selection of a first category, the first category being one of a plurality of categories organized in a category hierarchy, the category hierarchy constituting a first sub-portion of a product hierarchy;
identifying an association with at least two attribute hierarchies, the at least two attribute hierarchies constituting a second sub-portion of the product hierarchy, each of the at least two attribute hierarchies being distinct in the product hierarchy from the category hierarchy, and each of the at least two attribute hierarchy hierarchies including at least one set of attributes associated with the selected first category, wherein each individual attribute hierarchy within the at least two attribute hierarchies includes at least one attribute value associated with the items in the selected first category;
determining a prioritization of the attributes individual attribute hierarchies within the at least two attribute hierarchies;

determining a subset of the at least two attribute hierarchies for display based at least in part on the determined prioritization;
for each individual attribute hierarchy within the determined subset of the at least two attribute hierarchies, retrieving the at least one attribute value corresponding to the individual attribute hierarchy; and
causing the selected first category, the determined subset of the at least two attribute hierarchies, and the at least one attribute value corresponding to each individual attribute hierarchy within the determined subset of the at least two attribute hierarchies to be displayed.

8. The computer implemented method of claim 7, wherein the category hierarchy of the selected first category includes other categories.

9. The computer-implemented method of claim 8, wherein the other categories are associated with the at least one set of attributes.

10. The computer-implemented method of claim 7, wherein the selected first category includes at least one sub-category.

11. The computer-implemented method of claim 10, wherein the at least one sub-category is associated with the at least two attribute hierarchies.

12. The computer-implemented method of claim 8, wherein the at least one attribute value corresponding to each individual attribute hierarchy within the determined subset of the at least two attribute hierarchies includes information about the category.

13. The computer-implemented method of claim 7, further comprising:
in response to selection of a second category, causing display of the second category, at least one attribute hierarchy associated with the second category, and at least one attribute value associated with the second category.

14. A computer-implemented method for associating categories and attributes, the method comprising:
for at least one category of a plurality of categories organized in a category hierarchy, the category hierarchy constituting a first sub-portion of a product hierarchy, searching a data store for attribute hierarchies to be associated with the at least one category, the attribute hierarchies constituting a second sub-portion of a product hierarchy, the at least one category hierarchy being distinct in the product hierarchy from the attribute hierarchies;
applying attribute assignment rules to the attribute hierarchies and the at least one category to identify at least two attribute hierarchies that are related to the at least one category, each identified attribute hierarchy including at least one attribute, the at least one attribute having an attribute value associated with items in the category;
determining a prioritization of individual attribute hierarchies within the identified at least two attribute hierarchies;
associating the identified at least two attribute hierarchies with the at least one category according to the determined prioritization;
in response to a user selection of the at least one category, determining a subset of the identified at least two attribute hierarchies for display based at least in part on the determined prioritization; and
causing display of the at least one category and the determined subset of the identified at least two attribute hierarchies.

15. The computer implemented method of claim 14, further comprising associating at least one attribute included in the identified at least two attribute hierarchies with the at least one category.

16. The computer implemented method of claim 14, wherein applying attribute assignment rules comprises at least one of applying attribute assignment rules automatically, manually, and using a combination of manual attribute assignment and automatic attribute assignment.

17. The computer implemented method of claim 14, wherein applying attribute assignment rules is based on predefined category-attribute relations.

18. The computer implemented method of claim 14, further comprising applying the attribute assignment rules to attribute hierarchies and a category newly added to the category hierarchy.

19. A computer-implemented method of filtering browse information, the method comprising:
in response to receiving a category selection, the category being one of a plurality of categories organized in a category hierarchy, the category hierarchy constituting a first sub-portion of a product hierarchy, identifying associations to at least two attribute hierarchies, the at least two attribute hierarchies constituting a second sub-portion of the product hierarchy, the at least two attribute hierarchies being distinct in the product hierarchy from the category hierarchy, each of the at least two attribute hierarchies including one or more attributes, each attribute including one or more attribute values, the attribute values being associated with items in the selected category and other attribute values;
determining a prioritization of individual attribute hierarchies within the at least two attribute hierarchies;
determining a first subset of the at least two attribute hierarchies based at least in part on the determined prioritization;
causing display of the selected category, the first subset of the at least two attribute hierarchies, and the one or more attribute values; and
in response to receiving an attribute value selection, causing removal from display one or more categories not associated with the selected attribute value, causing removal from the UI of a at least one attribute hierarchy of said subset, said at least one attribute hierarchy being determined based at least in part on the determined prioritization of the at least two attribute hierarchies, and causing display of one or more categories associated with the selected attribute value.

20. The computer-implemented method of claim 19, further comprising in response to receiving the category selection, removing from display one or more attributes and one or more attribute values not associated with the selected category.

21. The computer-implemented method of claim 19, wherein the one or more attributes associated with the selected category are also associated with a sub-category of the selected category.

22. A non-transitory computer-readable medium having computer executable instructions encoded thereon that when executed on a computing device cause the computing device to:
in response to selection of a category, the category being one of a plurality of categories organized in a category hierarchy, the category hierarchy constituting a first sub-portion of a product hierarchy, identify an association with at least two attribute hierarchies, the at least two attribute hierarchies constituting a second sub-portion of the product hierarchy, each of the at least two attribute hierarchies being distinct in the product hierarchy from the category hierarchy, and each of the at least two attribute hierarchy hierarchies including at least one set of attributes associated with the selected category, wherein each individual attribute hierarchy within the at least two attribute hierarchies includes at least one attribute value associated with the items in the selected category, and wherein each individual attribute hierarchy within the at least two attribute hierarchies is associated with other categories included in other category hierarchies;
determine a prioritization of the individual attribute hierarchies within the at least two attribute hierarchies;
determine a subset of the at least two attribute hierarchies for display based at least in part on the determined prioritization; and
cause display of the selected category, the determined subset of the at least two attribute hierarchies, and the at least one attribute value corresponding to each individual attribute hierarchy within the determined subset of the at least two attribute hierarchies.

* * * * *

UNITED STATES PATENT AND TRADEMARK OFFICE
CERTIFICATE OF CORRECTION

PATENT NO. : 8,850,362 B1
APPLICATION NO. : 11/948869
DATED : September 30, 2014
INVENTOR(S) : Cyrus Khoshnevisan et al.

Page 1 of 1

It is certified that error appears in the above-identified patent and that said Letters Patent is hereby corrected as shown below:

In the Claims

In column 13 at line 59, In Claim 7, change "hierarchy hierarchies" to --hierarchies--.

In column 13 at line 65, In Claim 7, change "attributes individual" to --individual--.

In column 14 at line 26, In Claim 12, change "claim 8," to --claim 7,--.

In column 16 at line 26, In Claim 22, change "hierarchy hierarchies" to --hierarchies--.

Signed and Sealed this
Sixteenth Day of June, 2015

Michelle K. Lee
*Director of the United States Patent and Trademark Office*